US011885162B2

(12) United States Patent
Nakanishi

(10) Patent No.: US 11,885,162 B2
(45) Date of Patent: Jan. 30, 2024

(54) COUNTER BALANCE DEVICE FOR A SASH WINDOW

(71) Applicant: Nakanishi Industrial Co., Ltd., Tokyo (JP)

(72) Inventor: Yoshikazu Nakanishi, Tokyo (JP)

(73) Assignee: NAKANISHI INDUSTRIAL CO., LTD.

( * ) Notice: Subject to any disclaimer, the term of this patent is extended or adjusted under 35 U.S.C. 154(b) by 167 days.

(21) Appl. No.: 17/674,868

(22) Filed: Feb. 18, 2022

(65) Prior Publication Data

US 2023/0265700 A1 Aug. 24, 2023

(51) Int. Cl.
*E05D 13/00* (2006.01)

(52) U.S. Cl.
CPC ................................ *E05D 13/1253* (2013.01)

(58) Field of Classification Search
CPC ........... E05D 5/02; E05D 13/10; E05D 13/12; E05D 13/1253; E05D 13/1276; E05D 13/1284; E05D 13/1292; E05D 15/165; E05Y 2900/148; E06B 3/44; E06B 3/4407; E06B 3/4415; E06B 16/193; E06B 16/197
See application file for complete search history.

(56) References Cited

U.S. PATENT DOCUMENTS

| | | | | |
|---|---|---|---|---|
| 2,604,655 A * | 7/1952 | Peremi | E05D 13/1253 | 16/197 |
| 2,825,089 A * | 3/1958 | Larson | E05D 13/1253 | 267/157 |
| 2,890,480 A * | 6/1959 | Gregg | E05D 13/123 | 16/197 |
| 2,952,048 A * | 9/1960 | Conway | E06B 3/44 | 49/446 |
| 3,047,905 A * | 8/1962 | Douglas | E05D 13/1253 | 16/197 |
| 5,267,416 A * | 12/1993 | Davis | E05D 13/12 | 49/447 |
| 5,383,303 A * | 1/1995 | Nakanishi | E05D 13/1253 | 49/181 |
| 6,115,884 A * | 9/2000 | DeJong | E05D 13/1253 | 16/197 |
| 10,385,599 B2 | 8/2019 | Nakanishi | E05D 13/1253 | |
| 2019/0032385 A1* | 1/2019 | Nakanishi | E05D 13/1253 | |

FOREIGN PATENT DOCUMENTS

| | | | | |
|---|---|---|---|---|
| GB | 2379237 A * | 3/2003 | E05D 13/1207 |
| JP | 59014622 | 4/1984 | |
| JP | 03197785 A * | 8/1991 | |
| JP | 3743510 B2 * | 2/2006 | |
| JP | 2008057653 | 3/2008 | |

* cited by examiner

*Primary Examiner* — Chuck Y Mah
(74) *Attorney, Agent, or Firm* — ADAMS & WILKS

(57) ABSTRACT

A counter balance device for a sash window includes a spiral balance having a hand-wound spiral rod connected to wind a torsion spring to generate an initial spring force that counter balances the window's weight for keeping the sash up when raised. The lower end of the spiral rod is connected to a rotation shaft rotatably disposed on a slide block. When a large repulsion force produced by the torsion spring is applied to the spiral rod, the rotation shaft is urged in a direction reverse to the rotation direction of the spiral rod by a buffer spring having a spring force which is larger than the initial spring force so that the rotation of the rotation shaft is tolerated.

11 Claims, 4 Drawing Sheets

COUNTER BALANCE DEVICE FOR A SASH WINDOW

FIELD OF THE INVENTION

The present invention relates generally to a counter balance device for a sash window and, more particularly, to a counter balance device having a spiral balance by which raising and lowering of the window can be done easily and with little effort and the window can be held at any desired position.

BACKGROUND INFORMATION

Sash windows are constructed to be opened and closed by raising and lowering the window. In the case of a heavy window, more effort is required to raise and lower the window. When the window is to stay in a desired open position, it nevertheless sometimes drops down by its own weight. In order to avoid such a situation, a counter balance device has been used to counter balance the weight of the window by inducing a counter balance load equivalent to the window's weight when raising or lowering the window. As one type of counter balance device, a spiral balance having a torsion spring and a spiral rod has been widely known.

An example of such a spiral balance is described in Japanese Utility Model No. Sho 59-14622, wherein a torsion spring is housed in a pipe secured to a window frame, an upper end of the torsion spring is secured to an upper portion of the pipe and a lower end of the torsion spring is secured to a coupling rotatably disposed at a lower portion of the pipe. A spiral rod is threadedly engaged with the coupling and inserted into the pipe, and a lower end of the spiral rod protrudes downwardly from the pipe. The lower end of the spiral rod is non-rotatably connected to a slide block which slides within a transverse slot provided in the window frame, and a window is installed on a connecting member disposed on the slide block.

By this structure, the lower end of the spiral rod is non-rotatably connected to the window. Alternatively, the pipe may be connected to the window side and the spiral rod may be connected to the window frame side.

When letting the window down, since the spiral rod travels in an axial direction together with the window, the coupling rotates and the torsion spring is wound up by the coupling. The frictional engagement force between the coupling and the spiral rod is increased by the winding motion, and the spiral rod and the coupling are further strongly frictionally engaged by the repulsion of the torsion spring in response to the winding motion. When the frictional engagement force surpasses the window's weight represented by the repulsion of the torsion spring and balances with the window's weight, it becomes possible to stop the window at any desired position.

The torsion spring is wound to apply an initial spring force corresponding to the window's weight so that the window will not fall down by its own weight when the window is located at an upper position. Since the torsion spring is further wound when the window is shut, the repulsion (restoring force) exerted by the torsion spring acts on the spiral rod when the window goes down. In order to suppress the increment of winding quantities of the torsion spring, and as a usual adjustment measure in the art, the pitch of the screw portion of the torsion spring is varied so that the winding quantities of the torsion spring will be gradually decreased. However, even if the pitch is varied in this way, since the repulsion when the window reaches its lowest downward position is very large, it is often difficult to completely shut the window without strongly pushing the window down.

The lower end of the spiral rod is usually non-rotatably connected to the window via a slide block which slides within the window frame as mentioned above, and the repulsion acting on the spiral rod is transmitted as a rotation force for rotating the spiral rod in such a direction to push the slide block towards the window frame. The rotation force acts as a large resistance to sliding between the slide block and the window frame when the window is pushed upwardly, and considerable effort is required to move the window.

When the lower end of the spiral rod is rotatably connected to the slide block, the rotation force is not transmitted. In such a case, however, the spiral rod is freely rotated by the repulsion (restoring force) of the torsion spring, and therefore it is difficult to obtain the action and effect of a spiral balance which is expected to hold the window at an optional position by making balance with the window's weight by increment of a friction engagement force.

A spiral balance having a structure in which the lower end of the spiral rod is connected to the slide block via a rotatable revolving body for adjustment is described in JP-A-2008-57653. However, the function of the spiral balance cannot be achieved if the lower end of the spiral rod is rotated in normal use conditions as mentioned above, and therefore in the device described in the above publication, the revolving body for adjustment is non-rotatably fitted with the slide block via a one-way clutch. When it is required to adjust the torsion force, the spiral rod can be rotated in such a direction that the torsion spring is wound by turning the revolving body for adjustment by use of a tool such as a driver.

As mentioned above, although a structure in which the lower end of the spiral rod is connected to the slide block via a rotatable member has been conventionally known, the spiral rod of this structure cannot be rotated when a large rotation force acts on the spiral rod by the repulsion of the torsion spring, and thus such a structure does not function to reduce the difficulty in the opening or closing operation of the window.

SUMMARY OF THE INVENTION

It is an object of the present invention to provide a counter balance device for a sash window in which a spiral rod is transferred in an axial direction to wind a torsion spring, and a lifting force acts on the spiral rod by repulsion of the torsion spring to counter balance the window's weight, wherein when the window is transferred downward to a lower position, the force necessary for pushing the window down can be reduced, and when the window is raised or lowered, the resistance to sliding applied to the window frame can be reduced by the repulsion of the torsion spring via the spiral rod, whereby the window can be raised or lowered with little effort.

To accomplish the above and other objects, the present invention provides a counter balance device for a sash window, comprising a pipe extending along a window frame, a spiral rod housed in the pipe, the spiral rod having a screw portion extending along a longitudinal direction and a lower end protruding from a lower end of the pipe, a coupling rotatably disposed near the lower end of the pipe and through which the spiral rod is inserted and threadedly engaged, a torsion spring which has a lower end secured to the coupling and an upper end secured to an upper end of the pipe and to which an initial spring force corresponding to the window's weight is applied by winding the torsion spring, a slide block slidably disposed along the window frame and connected to the window, and a rotation shaft which is rotatably mounted on the slide block and to which is connected the lower end of the spiral rod, wherein when a large repulsion force exerted by the torsion spring acts on the rotation shaft via the spiral rod, a buffer spring exerting a spring pressure larger than the initial pressure of the torsion spring acts to urge the rotation shaft in a direction reverse to the rotation direction of the spiral rod so that the rotation of the rotation shaft is tolerated.

The present invention also provides a counter balance device for a sash window wherein the buffer spring is constituted by a coiled spring, one end of the coiled spring is supported by the rotation shaft and the other end thereof is supported by the slide block, the rotation shaft has an outwardly extending projection, and the slide block has two spaced-apart stoppers facing each other with the projection interposed therebetween to control a rotational range of the rotation shaft.

In a counter balance device constructed according to the present invention as described above, when the window is pushed down, the coupling is rotated and the torsion spring is wound by the vertical transfer of the spiral rod, and the frictional engagement force acting between the coupling and the spiral rod is increased by the repulsion of the torsion spring acting on the spiral rod, whereby the window can be stopped at any desired position. When the window reaches near the maximum pushed-down position and the rotation force acting on the spiral rod is increased, by the repulsion of the torsion spring, the spiral rod is rotated against the rotation shaft which is urged towards a direction reverse to the rotation of the spiral rod, and the rotation force acting on the slide block is reduced, whereby it becomes possible to push the window down. When it is attempted to raise the window, since the slide block is in slidable contact with the window frame elastically by the buffer spring, and the slide block is slightly rotatable in a rotation range of the rotation shaft, whereby the force necessary for raising the window can be reduced.

Further, since the rotation shaft has an outwardly protruding projection and the slide block has stoppers, the rotation range of the rotation shaft is regulated and the rotation shaft does not needlessly rotate, and therefore a frictional engagement force which is equivalent to the initial spring force can be always assured between the spiral rod and the coupling, whereby risks such as unintended falling of windows can be eliminated.

DETAILED DESCRIPTION OF THE PREFERRED EMBODIMENTS

Figure 1:
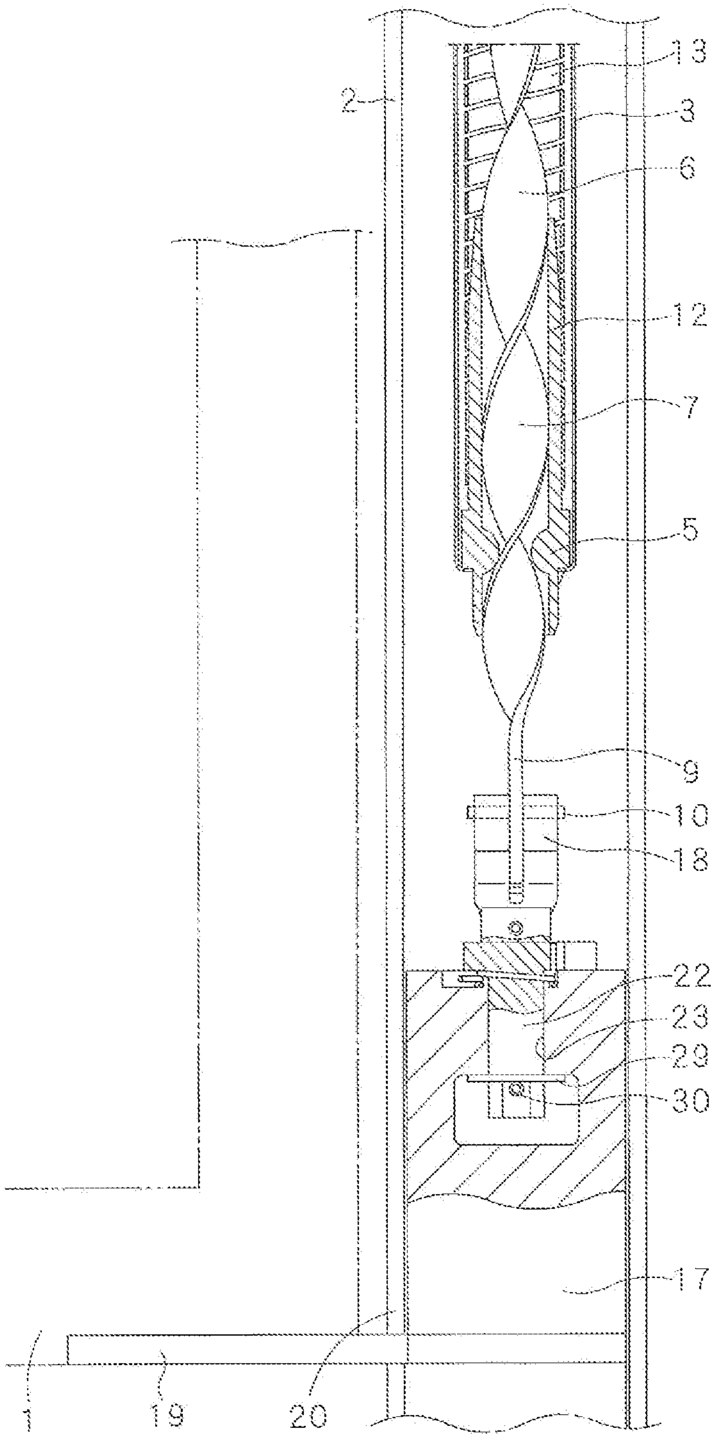
FIG. 1(A) is a partial cross-sectional view of a lower portion of a spiral balance installed in a frame of a sash window according to one embodiment of the present invention.
FIG. 1(B) is a partial cross-sectional view of an upper portion of the spiral balance installed in the frame.
Figure 1:
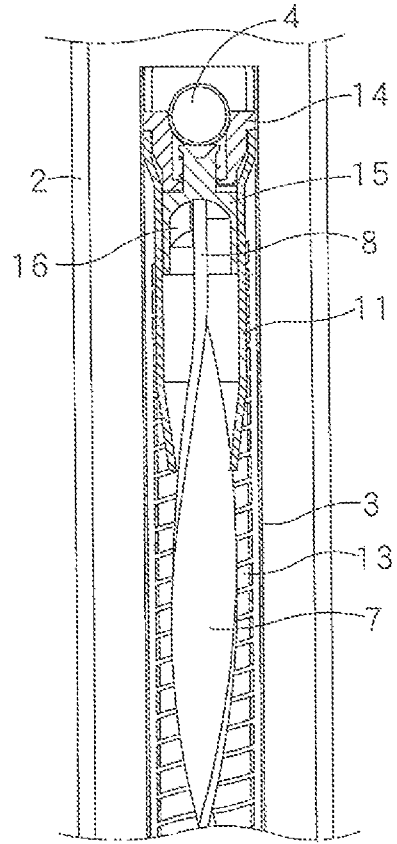

FIGS. 1A and 1B show one embodiment of a counter balance device for a sash window constructed according to the principles of the present invention. In this embodiment, the counter balance device incorporates a spiral balance, and various types of conventionally known spiral balances may be used. FIGS. 1A-1B show an example where the present invention is applied to the spiral balance described in U.S. Pat. No. 10,385,599 assigned to Nakanishi Industrial Co., Ltd., the assignee of the present application. U.S. Pat. No. 10,385,599 is incorporated herein by reference in its entirety.

With reference to FIGS. 1A-1B, the spiral balance comprises a pipe 3 installed in a window frame 2 of a sash window 1. The pipe 3 has an upper end and a lower end which are both open, and the pipe is secured to the window frame 2 by inserting a fixing screw (not shown) through a fixing hole 4 formed near the upper end. At the lower end side of the pipe 3, a coupling 5 is rotatably installed, and a spiral rod 7 having a screw portion 6 threadedly engaged with a slot in the coupling 5 is inserted into the pipe 3. The spiral rod 7 has such a length that its upper end 8 reaches near the upper end of the pipe 3 and its lower end 9 protrudes downwardly from the lower end of the pipe 3.

FIGS. 1A-1B show the sash window 1 in a raised position, and the lower end 9 of the spiral rod 7 which protrudes downwardly has a fixing pin 10 disposed to secure it to the window side. Into the upper portion of the pipe 3, an upper sleeve 11 which is to be fixed by a fixing screw is inserted, and at a downward portion of the upper sleeve 11, a small diameter portion is formed. A torsion spring 13 has two ends, one of which is secured to the small diameter portion of the upper sleeve 11 and the other of which is secured to a lower sleeve 12 formed above the coupling 5.

As conventionally known, when the spiral rod 7 moves downwardly to shut the window 1, the torsion spring 13 is wound, and when the spiral rod 7 moves upwardly to open the window 1, the torsion spring is unwound. Ideally, the amount of winding during downward movement of the spiral rod 7 is the same as the amount of unwinding during upward movement of the spiral rod. Alternatively, the present invention may be applied to a sash window in which the pipe 3 is connected to the window side and the spiral rod 7 is connected to the window frame side.

To a large diameter portion of the upper sleeve 11, a fixing member 14 is inserted and secured, and to a small diameter portion below a lower face side of the fixing member 14, an adjustment member 15 is rotatably inserted. The adjustment member 15 is urged towards the fixing member 14 by a coil spring (not numbered) which is used to pull it upwardly. An engagement projection 16 is disposed at the inner face of the adjustment member 15, and when the spiral rod 7 is located at the upward position, the upper end 8 of the spiral rod 7 engages with the engagement projection 16 in such a manner that the engagement projection 16 is in a state that it faces the upper end 8 in a circumferential direction. Between the upper face of the adjustment member 15 and the lower face of the fixing member 14, a one-way clutch mechanism such as a ratchet mechanism is disposed which allows rotation of the adjustment member 15 in such a direction that the torsion spring 13 is wound relative to the fixing member 14, but prevents rotation of the adjustment member 15 in such a direction that the torsion spring 13 is unwound. In the present embodiment, the ratchet mechanism is similar to the one disclosed in U.S. Pat. No. 10,385,599 that allows the adjustment member to rotate in a direction of winding the torsion spring and prevents the adjustment member from rotating in a direction of unwinding the torsion spring.

As described above, the adjustment member 15 is combined with the fixing member 14 via the one-way clutch. By this structure, before the spiral balance is disposed at the window 1 or when the spiral rod 7 is in a raised position, by rotating the spiral rod 7, the coupling 5 is rotated and the torsion spring 13 can be wound. Accordingly, before installing the counter balance device of the present invention in the window 1 or after installation thereof, it is possible to easily impart to the torsion spring an initial spring force which is equivalent to the window's weight.

Figure 2:
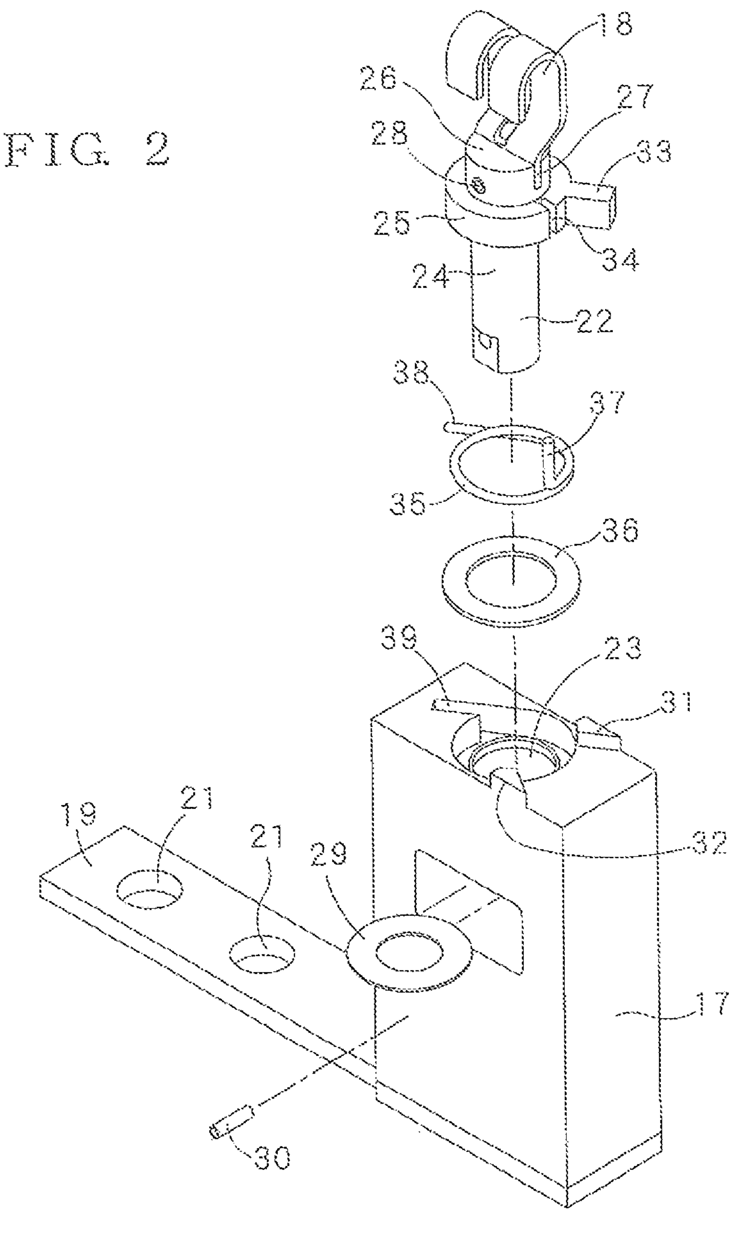
FIG. 2 is an exploded perspective view of one example of a slide block used with the spiral balance of FIG. 1.
Figure 3:
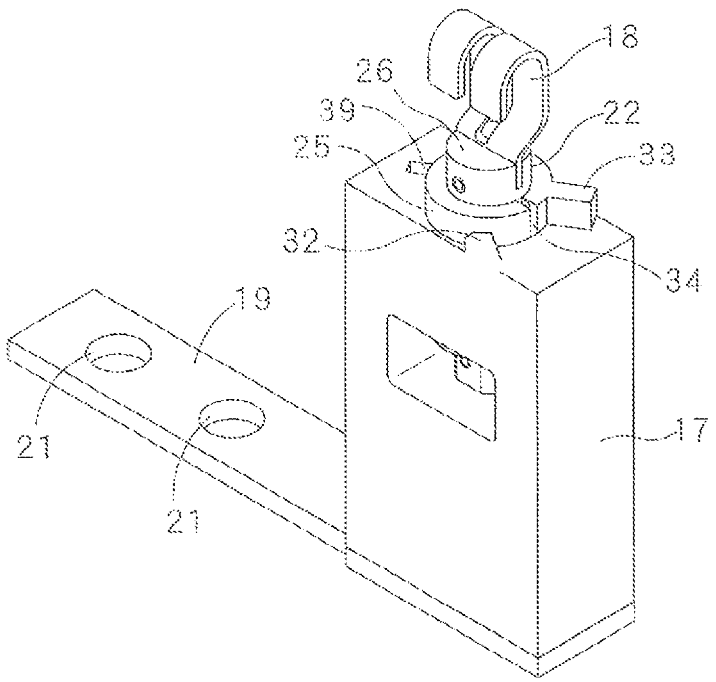
FIG. 3 is a perspective view of the slide block.
Figure 4:
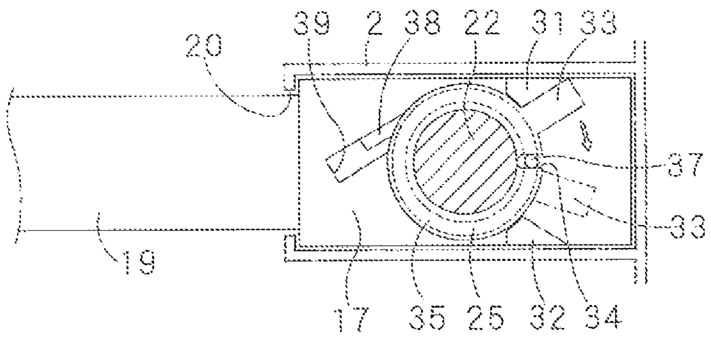
FIG. 4 is an explanatory view, partly in cross section, showing a rotation shaft mounted in the slide block.

During installation of the spiral balance, a slide block 17 is slidably inserted into the window frame 2. As illustrated in FIGS. 2-4, the slide block 17 may have a rectangular parallelepiped shape, though may be formed in another appropriate shape such as a plate-like shape. The fixing pin 10 disposed at the lower end 9 of the spiral rod 7 is detachably connected to a hook 18 disposed on the slide block 17. Here, the detachable connection can be made by, for example, disposing a fixing pin at the slide block 17 side and a hook at the spiral rod 7 side, or any other appropriate mechanism. On the slide block 17, a connecting member 19 for connection with the window 1 is disposed, and the connecting member 19 extends in a direction towards the window through a transverse slot 20 formed in the window frame 2 and is secured to the window by inserting a fixing bolt or the like through a fixing hole 21.

On the slide block 17, a rotation shaft 22 is rotatably disposed. As shown in FIG. 2, the rotation shaft 22 has a main cylindrical portion 24 rotatably inserted into a rotation hole 23 formed in the slide block 17, a pedestal portion 25 formed above the main cylindrical portion 24, and a connecting portion 26 formed above the pedestal portion 25. In a slot 27 formed in the connecting portion 26, a base portion of the hook 18 is inserted and secured by a securing pin 28. As shown in FIGS. 1A and 2, the lower end of the main cylindrical portion 24 protrudes downwardly from the rotation hole 23 and is prevented from detachment by a retaining pin 30 via a washer 29. The pedestal portion 25 of the rotation shaft 22 has a projection 33 that extends radially outwardly from the periphery of the pedestal portion, and the projection is interposed between two spaced-apart stoppers 31 and 32 provided on the upper surface of the slide block 17. The stoppers 31 and 32 are positioned in the path of rotation of the projection 33 whereby the projection abuts one or the other of the stoppers to control the range of rotation of the rotation shaft 22.

As shown in FIGS. 2-4, between the rotation shaft 22 and the slide block 17 is disposed a buffer spring 35 which is in a compressed state and urges the rotation shaft 22 in a direction reverse to the rotation direction of the spiral rod 7 with a spring force which is larger than the initial spring force so as to allow rotation of the rotation shaft 22 when a large repulsion force generated by the torsion spring 13 acts on the rotation shaft 22 via the spiral rod 7. The buffer spring 35 may be constituted by an appropriate elastic body, and the buffer spring 35 is preferably constituted by a coiled spring. The coiled buffer spring 35 is inserted into the rotation hole 23 via a washer 36. One end portion 37 of the buffer spring 35 is bent upwardly and inserted in a locking slot 34 formed in the pedestal portion 25 of the rotation shaft 22, and the other end portion 38 of the buffer spring is straight and uncoiled and is inserted in a locking slot 39 disposed on the slide block 17.

In the above structure, when the window 1 is pushed down, transfer of the spiral rod 7 induces rotation of the coupling 5 and the torsion spring 13 is thereby wound, by which the repulsion of the torsion spring 13 acting on the spiral rod 7 increases the frictional engagement force acting between the coupling 5 and the spiral rod 7, whereby it becomes possible to stop the window 1 at a desired position. When the window reaches near the maximum pushed-down position in the range of shutting the window and the rotation force acting on the spiral rod is increased, the spiral rod 7 rotates against the rotation shaft 22 which is urged towards a direction reverse to the rotation of the spiral rod 7, and the rotation force acting on the slide block 17 is relaxed, whereby it becomes possible to push the window down using relatively light force. Since the slide block 17 is in elastically slidable contact with the window frame by the buffer spring 35, when the window is raised, the slide block 17 becomes slightly rotatable in a rotation range of the rotation shaft 22, whereby the force necessary for raising the window can be reduced and the window can be raised with a relatively light force.

Since the buffer spring 35 has a spring force larger than the initial spring force imparted to the torsion spring 13, when the window is located at a raised position, namely, when the spiral rod 7 is located at a raised position, the projection 33 disposed on the rotation shaft 22 abuts against the stopper 31 formed on the slide block 17. Accordingly, it is possible to prevent rotation of the spiral rod 7 and the window does not fall, down by its own weight. Further, even if the spiral rod 7 rotates with a large force against the buffer spring 35, the rotation shaft 22 abuts against the other stopper 32 and further rotation of the spiral rod 7 can be prevented, whereby the friction engagement force generated between the spiral rod and the coupling 5 can be assured and the counter-balanced condition with the window's weight can be held.

It will be appreciated by those of ordinary skill in the art that obvious changes, alterations and modifications can be made to the examples and embodiments described in the foregoing description without departing from the broad inventive concept thereof. It is understood, therefore, that this disclosure is not limited to the particular examples and embodiments disclosed, but is intended to cover all such obvious changes, alterations and modifications thereof which are within the scope and spirit of the disclosure as defined by the appended claims.

What is claimed is:

1. A counter balance device for a sash window, comprising a pipe extending along a window frame;

a spiral rod housed in the pipe, the spiral rod having a screw portion formed along a longitudinal direction and a lower end protruding from a lower end of the pipe;

a coupling rotatably disposed near the lower end of the pipe, the coupling having a slot through which the spiral rod is inserted and threadedly engaged;

a torsion spring which has a lower end secured to the coupling and an upper end secured near an upper end of the pipe and to which an initial spring force corresponding to the window's weight is applied by winding the torsion spring;

a slide block slidably disposed along the window frame and connected to the window; and a rotation shaft rotatably mounted on the slide block, wherein the lower end of the spiral rod is connected to the rotation shaft; and wherein when a large repulsion force generated by the torsion spring acts on the rotation shaft via the spiral rod, a buffer spring having a spring force larger than the initial spring force acts to urge the rotation shaft in a direction reverse to the rotation direction of the spiral rod so that the rotation of the rotation shaft is tolerated.

2. The counter balance device for a sash window according to claim 1; wherein the buffer spring comprises a coiled spring having two opposite ends, one end being supported by the rotation shaft, and the other end being supported by the slide block.

3. The counter balance device for a sash window according to claim 2; wherein the rotation shaft has a projection and the slide block has two spaced-apart stoppers facing each other with the projection interposed therebetween to control a range of rotation of the rotation shaft.

4. The counter balance device for a sash window according to claim 1; wherein the rotation shaft has a projection and the slide block has two spaced-apart stoppers facing each other with the projection interposed therebetween to control a range of rotation of the rotation shaft.

5. A counter balance device for a sash window, comprising a pipe extending vertically along a window frame;

a spiral rod extending axially inside the pipe, the spiral rod having an upper end portion disposed in the pipe, a lower end portion protruding from a lower end of the pipe, and a screw portion extending axially between the upper and lower end portions;

a coupling rotatably disposed near the lower end of the pipe and having a slot through which extends the screw portion of the spiral rod;

a torsion spring extending axially inside the pipe and having a lower end fixed to the coupling to rotate therewith and an upper end fixed near an upper end of the pipe and to which an initial spring force corresponding to the window's weight is applied by winding the spiral rod in a direction to wind the torsion spring;

a slide block disposed to slide vertically along the window frame and connected to move with the window;

a rotation shaft rotatably mounted on the slide block and connected to the lower end of the spiral rod protruding from the pipe; and a buffer spring interposed between the rotation shaft and the slide block and having a spring force larger than the initial spring force of the torsion spring for urging the rotation shaft in a direction reverse to the winding direction of the spiral rod.

6. The counter balance device for a sash window according to claim 5; wherein the buffer spring comprises a coiled spring having two opposite ends, one end being supported by the rotation shaft, and the other end being supported by the slide block.

7. The counter balance device for a sash window according to claim 6; wherein the rotation shaft has a projection and the slide block has two spaced-apart stoppers facing each other with the projection interposed therebetween to control a range of rotation of the rotation shaft.

8. The counter balance device for a sash window according to claim 5; wherein the rotation shaft has a rotation hole in which is rotatably mounted a cylindrical portion of the rotation shaft.

9. The counter balance device for a sash window according to claim 8; wherein the buffer spring comprises a coiled compression spring having two opposite ends, one end being supported by the rotation shaft, and the other end being supported by the slide block.

10. The counter balance device for a sash window according to claim 9; wherein the buffer spring one end is bent upwardly and inserted in an opening in the rotation shaft and the buffer spring other end extends straight and is inserted in an opening in the slide block.

11. The counter balance device for a sash window according to claim 10; wherein the rotation shaft has a projection and the slide block has two spaced-apart stoppers facing each other with the projection interposed therebetween to control a range of rotation of the rotation shaft.

* * * * *